March 9, 1965   J. P. PARULSKI   3,172,224
FISHHOOK SETTING MECHANISM
Filed March 29, 1963

INVENTOR.
Joseph P. Parulski
BY Cyril M. Hajewski
Attorney

United States Patent Office 3,172,224
Patented Mar. 9, 1965

3,172,224
FISHHOOK SETTING MECHANISM
Joseph P. Parulski, 2567 S. 69th St., Milwaukee 19, Wis.
Filed Mar. 29, 1963, Ser. No. 269,023
6 Claims. (Cl. 43—15)

This invention relates generally to a mechanism for mechanically jerking a fishing line to set the fishhook in the mouth of a fish.

When fishing with a hook and line it is necessary for the fisherman to apply a sharp jerk to the line at the proper time when a fish is taking the bait for the purpose of setting the hook in the mouth of the fish. This action on the part of the fisherman is particularly important when fishing with live bait attached to the hook and the hook is substantially motionless or moving slowly in the water. Occasionally, the fisherman may desire to place the fishing rod down so that it is unattended and he then cannot set the hook when a fish is biting. When fishing through an opening in the ice on a body of water the fisherman may leave a line unattended in this manner most of the time and it is then of particular importance that an efficient mechanism be provided to respond to a bite for setting the hook in the mouth of the fish.

It is therefore a general object of the present invention to provide an improved mechanism that acts in response to the bite of a fish to jerk the line for setting the fishhook in the mouth of the fish.

Another object of the present invention is to provide an improved mechanical fishhook setting apparatus in which its sensitivity to the bite of the fish can be adjusted within limits and that can be set to be extremely sensitive so that it is triggered by the slightest pull on the fish line.

Another object is to provide an improved fishhook setting mechanism that can be mounted on the fishing rod and will not interfere with the normal use of the rod and line but can be activated in a moment for automating the fishing apparatus.

Another object is to provide an improved fishhook setting mechanism that is retained in the cocked position by the fishing line so that a slight tug on the line caused by the bite of a fish will cause the mechanism to be triggered for jerking the line to set the hook.

A further object is to provide an improved fishhook setting mechanism that is of extremely simple and inexpensive but sturdy construction and very efficient in operation.

According to this invention the improved fishhook setting mechanism comprises a base adapted to be attached to a fishing rod. An arm is pivotably supported by the base and a spring urges the arm into an idle position in engagement with the base on one side of its fulcrum. The arm is cocked by pivoting it approximately one hundred eighty degrees against the force of the spring into engagement with the base on the opposite side of the fulcrum.

A clasp is provided on the arm for securing the fishing line thereto and a latch is secured to the arm to cooperate with a catch for retaining the arm in its cocked position. However, the catch is inoperative to retain the latch until the fishing line is inserted into the catch in a manner to prevent the latch from moving out of the catch. The bite of a fish serves to withdraw the line from the catch for releasing the latch to enable the spring to pivot the arm to its idle position for jerking the line attached thereto and thereby set the hook in the mouth of the fish that has taken the bait.

The foregoing and other objects of the invention, which will become more fully apparent from the following detailed description, may be achieved by means of the apparatus described in connection with the accompanying drawings in which.

Figure 1:
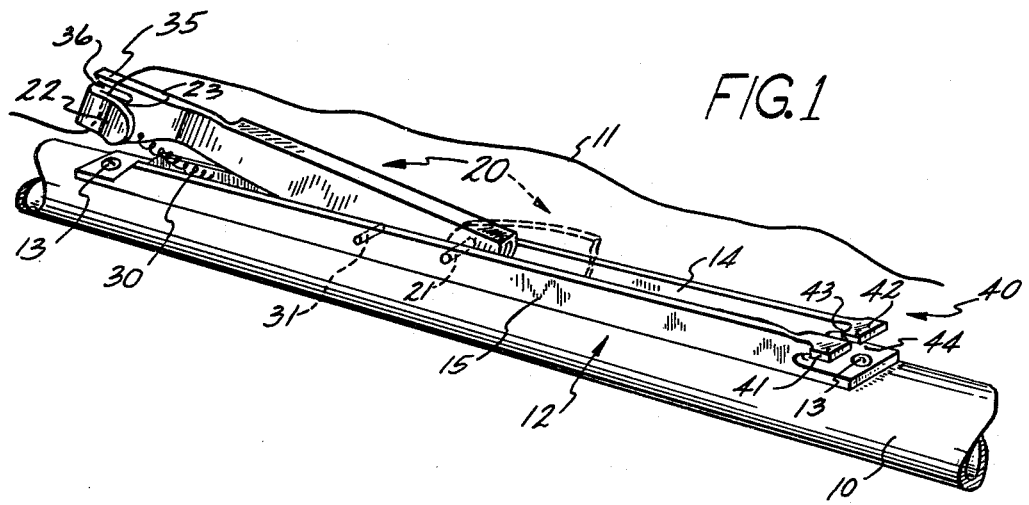
FIGURE 1 is a perspective view of a fishhook setting mechanism in released position and incorporating the features of the present invention and shown mounted on a fishing rod.

Reference is now made more particularly to the drawings and specifically to FIG. 1 thereof which illustrates a fishhook setting mechanism incorporating the features of the present invention. The mechanism is mounted on a fishing rod or cane pole 10 with only the portion of the rod 10 that supports the setting mechanism being shown in the view. The rod 10 is equipped with a conventional fishing line 11 having a hook (not shown) secured to its right end as viewed in FIG. 1.

The fishhook setting mechanism comprises a base 12 that is attached to the fishing rod 10 by screws 13 or other suitable fastening means. The base 12 is channel shaped having two parallel legs 14 and 15 in spaced relationship to form a slot or gap between them for receiving a pivotable arm generally identified by the reference numeral 20.

The arm 20 is pivotably supported by a pin 21 that is secured to the legs 14 and 15 and extends across the gap between the legs and through a suitable hole formed in one end of the arm 20 so that the pin 21 serves as a fulcrum for the arm 20 with the latter being disposed between the two legs 14 and 15 of the channel shaped base 12.

The opposite end of the arm 20 is provided with an overlapping portion 22 that is bent backward against the surface of the arm 20 to form a wedge shape groove 23 which receives the line 11 for attaching the latter to the swinging end of the arm 20. The line 11 is secured to the end of the arm 20 by drawing it tightly into the groove 23 to wedge it between the overlapping portion 22 and the surface of the arm 20. It is therefore apparent that the overlapping portion 22 and the surface of the arm 20 cooperate to form a grip or clasp which will securely retain the line 11 for attachment to the extending end of the arm 20.

A spring 30 is disposed within the slot formed by the legs 14 and 15 of the base 12 and is attached at one end to the extending end of the arm 20 and at its opposite end to a pin 31 that is attached to the base 12 and extends across the gap between the legs 14 and 15 adjacent to the fulcrum formed by the pin 21. With this arrangement, the spring 30 continuously urges the arm 20 in its pivotal movement to the left side of the fulcrum 21 as viewed in FIG. 1 to the position indicated by the solid line depiction of the arm 20 in FIG. 1. However, the arm 20 may be pivoted in a clockwise direction, as viewed in FIG. 1, to the position represented by the fragmentary broken line illustration of the arm 20 in FIG. 1. When the arm 20 is thus pivoted to the right side of the fulcrum 21 as viewed in FIG. 1, it is in its cocked position for applying a jerking action to the line 11 in response to the bite of a fish.

Figure 2:
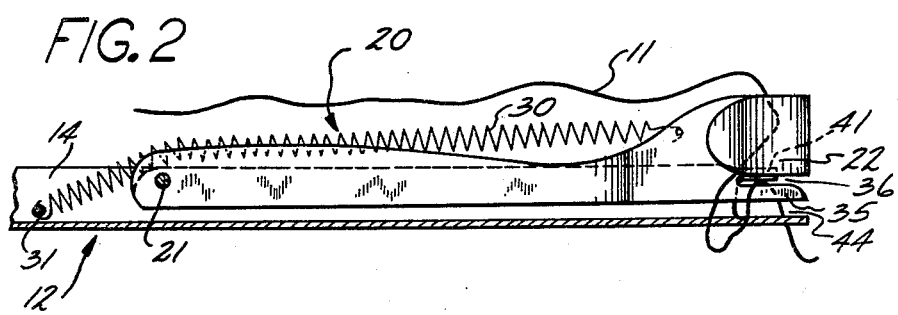
FIGURE 2 is a side elevational view of the fishhook setting mechanism shown in FIGURE 1 but in cocked position, with a leg of the channel shaped base broken away to more clearly illustrate the operating mechanism.

The cocked position of the arm 20 is fully illustrated in FIG. 2 wherein it will be noted that the arm 20 is disposed within the space between the legs 14 and 15 of the base 12 on the right side of the fulcrum 21. When the arm 20 is in this cocked position the spring 30 is stretched to apply a constant force urging the arm 20 in its pivotal movement in a counterclockwise direction for moving it out of the cocked position illustrated in FIG. 2 into the idle position depicted in FIG. 1. A locking mechanism is provided for releasably retaining the arm 20 in its cocked position as illustrated in FIG. 2 against the operation of the spring 30. This locking mechanism comprises a latch 35 on the swinging end of the arm 20 and formed by providing a slot 36 directly beneath the overlapping portion 22 so that the slot 36 separates the latch 35 from the overlapping portion 22 and the adjacent part of the arm 20.

Figure 3:
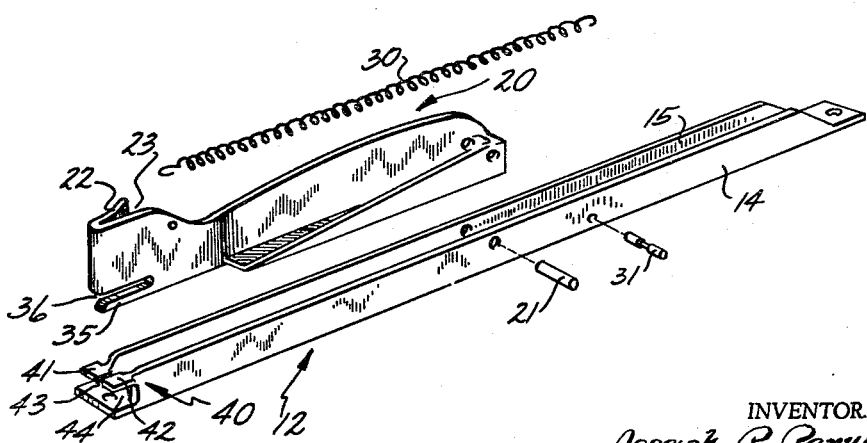
FIGURE 3 is a perspective exploded view of the mechanism depicted in FIGURE 1 with the several elements of the assembly being shown disconnected but in their assembled relationship.

The latch 35 operates in conjunction with a catch generally identified by the reference numeral 40 and comprising a pair of tongues 41 and 42. The tongue 41 extends from the end of the leg 15 and is formed integrally therewith, the tongue 42 being similarly formed and extending from the leg 14 of the base 12. The tongues 41 and 42 are in a single plane with their interior edges being separated from each other by a gap 43. The tongues 41 and 42 extend from the upper edges of the legs 15 and 14 so that they are elevated from the bottom of the base 12 to form an intervening space 44 between the lower surfaces of the tongues 41 and 42 and the bottom of the base 12 as clearly shown in FIGS. 2 and 3.

The rod 10 and its cooperating fishing line 11 may be operated in the usual manner with the line 11 being detached from the arm 20 of the fishhook setting mechanism. When it is desired to place the fishhook setting mechanism in operation, the line 11 is wedged into the groove 23 for attaching it to the swinging end of the arm 20 in the manner illustrated in FIG. 1. The arm 20 is then pivoted about the pin 21 approximately 180° in a clockwise direction from the idle position illustrated by solid lines in FIG. 1 to the cocked position illustrated in FIG. 2 and partially shown by broken lines in FIG. 1. As the arm 20 approaches its cocked position, the latch 35 is passed through the gap 43 and into the space 44 so that the uppermost edge of the latch 35 is disposed beneath the under surface of the tongues 41 and 42 as clearly depicted in FIG. 2. The portion of the line 11 immediately adjacent to the groove 23 and toward the hook (not shown) is then looped slightly and inserted into the space between the upper edge of the latch 35 and the under surfaces of the tongues 41 and 42 as clearly illustrated in FIG. 2. With the line thus positioned in the catch 40 between the latch 35 and the tongues 41 and 42, the catch becomes operative to retain the arm in its cocked position. Accordingly, the arm 20 may be released and the spring 30 will continue to urge it toward its idle position. However, the line 11 will extend across the gap 43 beneath the tongues 41 and 42 but above the latch 35 so that the latter is unable to pass through the gap so that the arm 20 will be retained in the cocked position. The line 11 therefore functions in the catch 40 to be engaged by the latch 35 for preventing the arm 20 from being pivoted to its idle position by the action of the spring 30.

The fishhook (not shown), of course, is tied to the right end of the line 11 as viewed in FIG. 2, and is in the water with a suitable bait attached to it. When a fish takes the bait it tugs the line 11 and thereby withdraws the line 11 from between the latch 35 and the tongues 41 and 42 to release the arm 20 by permitting the latch 35 to pass through the gap 43 between the two tongues 41 and 42. The spring 30 is strong enough to pivot the arm 20 in a relatively rapid movement in a counterclockwise direction as viewed in FIG. 2, to shift it to its idle position illustrated by the solid line depiction in FIG. 1. In the meantime, the line 11 remains attached to the swinging end of the arm 20 within the wedge shaped opening 23. As a result a sharp jerk is applied to the line 11 to cause the hook attached to its extending end to be set in the mouth of the fish that has taken the bait.

It will be noted from the view in FIG. 2 that the line 11 may be set between the latch 35 and the tongues 41 and 42 at a position very close to the outer edge of the tongues 41 and 42. When the line is thus located, it will require only a very slight tug on the hook end of the line to withdraw it from its locking position so that the mechanism becomes extremely sensitive to a very light bite by the fish. On the other hand, the line 11 may be positioned leftwardly from the location shown in FIG. 2 so that it is at the extreme inner end of the slot 36 and at a much greater distance from the outer edge of the tongues 41 and 42. Under these circumstances, it requires a stronger tug on the hook end of the line 11 to withdraw the line from the catch 40 so that the mechanism then becomes less sensitive. It is therefore apparent that it is a simple matter for the fisherman to adjust the sensitivity of the mechanism to suit the circumstances by properly positioning the line 11 within the slot 36 for setting the arm 20 in its cocked position.

From the foregoing detailed description of the construction and operation of the illustrative embodiment of the present invention it will become apparent that a new and improved fishhook setting mechanism has been provided which is very simple in construction but efficient in operation, using a minimum of parts by reason of the fact that the fishing line operates in a catch to retain the mechanism in its cocked position and the tug on the line caused by the fish taking the bait displaces the line from the catch to release the mechanism for applying the jerking action to the line.

Although the illustrative embodiment of the present invention has been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of the embodying structure, I hereby claim as my invention:

1. In a mechanism for jerking a fishing line in response to the bite of a fish for setting the fishhook in the mouth of a fish; a base; an arm pivotably supported by said base for movement between an idle position and a cocked position; a spring having one end connected to said base and its opposite end to said arm for continuously urging said arm to its idle position; a clasp on the swinging end of said arm for securing the fishing line thereto with a hook at the forward end of the line; a latch secured to the swinging end of said arm and forming a forwardly opening slot in the cocked position of said arm; and a pair of tongues supported above the bottom of said base in spaced relationship to form a gap between them and a forwardly open space therebeneath to enable said latch and slot to pass through the gap and beneath said tongues into said space when said arm is pivoted into its cocked position so that a portion of the fishing line extending forwardly beyond said clasp toward the hook may be inserted in said space and slot and between said latch and said tongues to extend across said gap beneath said tongues for preventing said latch to pass through said gap and thereby retain said arm in its cocked position, the fishing line being withdrawn from the space and slot by the bite of a fish taking the bait on the hook to permit said arm to be pivoted to its idle position for jerking the line attached to said clasp to set the fishhook in the mouth of the fish.

2. In a fishhook setting mechanism; a base; an arm pivotably supported by said base for movement between an idle position and a cocked position; means continuously urging said arm to its idle position; a clasp on said arm for securing a fishing line to the swinging end of said arm and with a hook at the forward end of the line; a latch mounted on said arm and forming a slot in said arm that opens forwardly when said arm is in the cocked position; and a catch supported by said base to form a forwardly open space beneath it for receiving said latch and slot and to cooperate with a portion of the line extending forwardly beyond said clasp which line portion is inserted into said space and slot for retaining said latch within the space beneath said catch to retain said arm in its cocked position, the fishing line being withdrawn from the space and slot by a fish taking the bait on the hook to release said latch and thereby enable said arm to be pivoted from its cocked position to its idle position for applying a jerking action to the line for setting the fishhook in the mouth of the fish.

3. In a mechanism for jerking a fishing line in response to the bite of a fish for setting the fishhook in the mouth of a fish; a base; an arm pivotably supported by said base for movement between an idle position and a cocked position; means urging said arm to its idle position; means on said arm for attaching the fishing line thereto, said line having a hook at its forward end; and locking means adapted to receive a portion of the fishing line that extends forwardly of said attaching means to be activated by the line for retaining said arm in its cocked position, said line being withdrawn from said locking means by the bite of a fish to deactivate said locking means and thereby release the arm for movement to its idle position whereby the fishing line will be jerked by the pivoting arm to set the hook in the mouth of the fish.

4. In a fishhook setting mechanism; a base; fishhook setting means supported by said base for movement between an idle position and a cocked position; means continuously urging said fishhook setting means to its idle position; means on said fishhook setting means for securing a fishing line thereto, said line having a hook at its forward end; locking means on said fishhook setting means; and catch means mounted on said base to receive said locking means and to receive a portion of the fishing line that extends forwardly of said securing means with the fishing line in said catch means engaging said locking means for activating said locking means to retain said fishhook setting means in its cocked position, the fishing line being withdrawn from said catch means by the bite of a fish on a bait placed on said hook tied to the fishing line, the withdrawal of the fishing line serving to inactivate said locking means to release the fishhook setting means for movement from its cocked position to its idle position for jerking the fishing line attached thereto to set the hook in the mouth of the fish.

5. In a mechanism for jerking a fishing line in response to the bite of a fish for setting the fishhook in the mouth of a fish; a base; fishhook setting means carried by said base and continuously urged from a cocked position to an idle position for jerking the fishing line that has a hook at its forward end; and locking means carried by said base and said setting means to be activated by a portion of the fishing line that is inserted into engagement therewith for retaining said fishhook setting means in its cocked position, the fishing line being withdrawn from said locking means by the bite of a fish to deactivate said locking means and thereby release said fishhook setting means for movement from its cocked position to its idle position for jerking the fishing line to set the fishhook in the mouth of the fish.

6. In a mechanism for jerking a fishing line in response to the bite of a fish for setting the fishhook in the mouth of a fish, the fishhook being secured to the forward end of the line; a base; fishhook setting means mounted on said base and operably connected to jerk the fishing line when actuated; actuating means connected to actuate said setting means; and locking means carried by said base and said setting means to be activated by a portion of the fishing line that extends forwardly from its connection with said setting means, said portion of the fishing line being inserted into engagement with said locking means for activating said locking means to render said actuating means inoperative; the fishing line being removable from said locking means by the bite of a fish taking a bait on said fishhook tied to the line for deactivating said locking means serving to intiate operation of said actuating means for acutating said fishhook setting means to jerk the fish line and thereby set the hook in the mouth of the fish.

References Cited by the Examiner

UNITED STATES PATENTS

| 1,516,484 | 11/24 | Meszaros. | |
| 1,934,536 | 11/33 | Hawkinson | 43—16 |
| 2,316,256 | 4/43 | Kohn | 43—15 |

FOREIGN PATENTS 697,684  11/30  France.

SAMUEL KOREN, *Primary Examiner.*